H. D. FLEGEL.
LIQUID GAGE.
APPLICATION FILED AUG. 28, 1914.
Reissued June 5, 1917.
14,314.
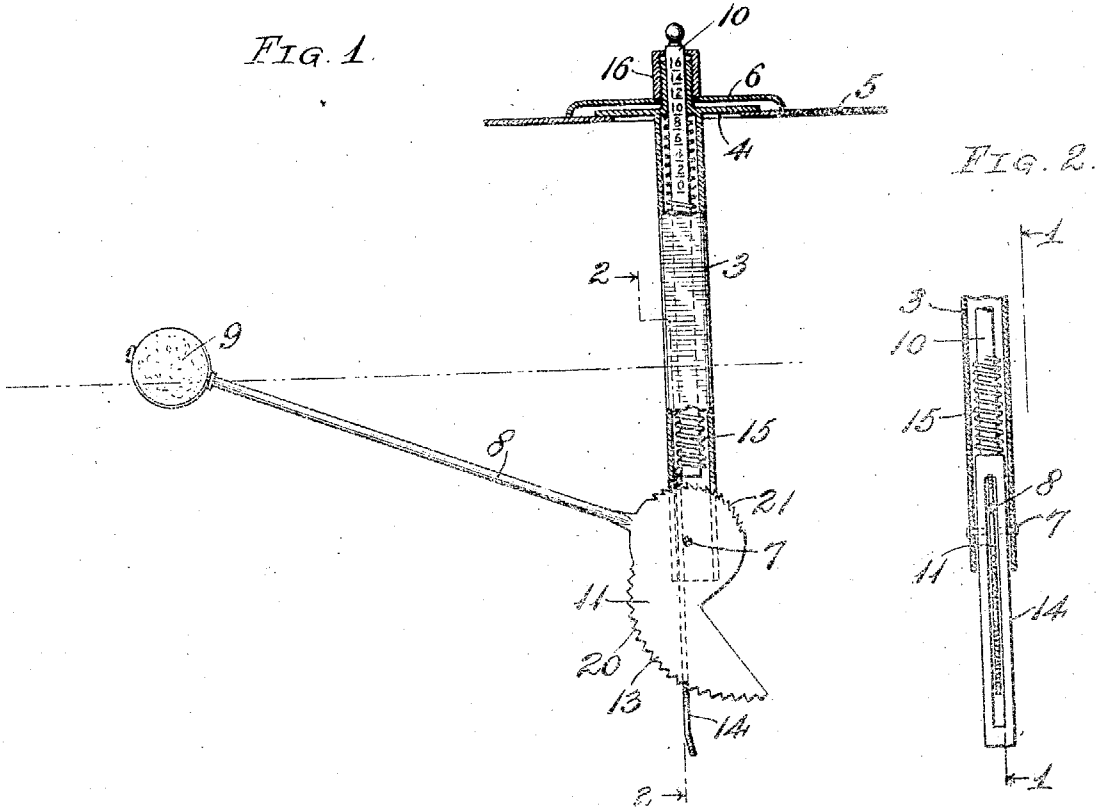
Witnesses:
Brennan B. West
Hugh B. McKill
Inventor:
Harrison D. Flegel
By Hull & Smith Att'ys.

UNITED STATES PATENT OFFICE.

HARRISON D. FLEGEL, OF RACINE, WISCONSIN, ASSIGNOR, BY MESNE ASSIGNMENTS, TO THE AKRON-SELLE CO., OF AKRON, OHIO, A CORPORATION OF OHIO.

LIQUID-GAGE.

14,314. Specification of Reissued Letters Patent. Reissued June 5, 1917.

Original No. 1,067,477, dated July 15, 1913, Serial No. 752,932, filed March 8, 1913. Application for reissue filed August 28, 1914. Serial No. 859,128.

*To all whom it may concern:*

Be it known that I, HARRISON D. FLEGEL, a citizen of the United States, and a resident of Racine, in the county of Racine and State of Wisconsin, have invented certain new and useful Improvements in Liquid-Gages; and I do hereby declare that the following is a full, clear, and exact description thereof.

This invention relates to gages for liquid containing tanks and has for its object the provision of a simple, economical and efficient gage, wherein all the parts may be made of a rugged and lasting character and the necessity for delicate adjustment and frictionless bearings may be done away with, the power for the operation of the indicating means being furnished by the operator. It is a further object of my invention to provide a construction wherein the indication shall be independent of the force or violence with which the operator actuates the mechanism, and further objects and advantages will become apparent as the description proceeds. While this invention is especially designed for use in connection with the hydrocarbon fuel tanks of motor vehicles, it will be apparent that it is applicable for use in other relations.

In the accompanying drawings wherein I have illustrated one embodiment of my invention, Figure 1 represents a partly sectional side-elevation of a liquid gage in accordance with my invention, and a fragment of a tank to which the gage is connected, the view being indicated by line 1—1 in the next described illustration; and Fig. 2 represents a sectional view of a fragment of the gage and is indicated by line 2—2 in Fig. 1, said gage being adaptable to a tank in which the liquid contents are subjected to pressure, though not limited to such use.

In general it may be stated that my invention comprises a float within the tank and a feeler member operable from without the tank and arranged to indicate, by its motion, the position of the float from time to time, the parts preferably being so arranged that the movement of the feeler member will lock the float in its position in such wise as to make the indication wholly independent of the force with which the feeler member is manipulated.

Referring by numerals to the drawings, 3 indicates a supporting member carried by a closure 4, the latter being applied to a suitable aperture in the wall of the tank 5 so as to locate the supporting member inside the tank. This closure is secured to the tank in any suitable, leak-tight, manner, and is here shown as concealed from view by a cover plate 6. Pivoted upon a substantially horizontal axis 7 carried by the supporting member 3 is a stem 8 having at its free end the float 9, and projecting through the plate 4 is a feeler member 10 whereby the location of the float can be detected. In the present embodiment the inner end of the stem is provided with a flat plate 11 having one of its edges, as 13, formed upon a spiral, while the feeler member consists of a longitudinally movable rod having at its inner end a longitudinally slotted plate 14 through which the plate 11 passes. The feeler member is normally maintained in inward position by suitable means such as the spring 15, and the distance it can be withdrawn from the tank at any time will depend upon the position of the float, thus indicating the depth of the liquid. The amount of this withdrawal can be estimated or measured in any convenient manner. In the present embodiment the side of the rod 10 is provided with graduations indicating the depth according to any convenient scale, that here shown being in gallons, and the supporting member 3 is made of tubular form so as to form a housing for this rod and spring. The outer face of the cover plate is here shown as provided with a packing gland 16 so that leakage may be prevented. In order to prevent the upward pull of the feeler member or rod 10 from displacing the plate by virtue of the camming action developed by the spiral edge 13, I have shown this edge as formed with serrations 20, so that the float will be positively locked in place upon the withdrawal of the feeler member and the reading obtained will be totally independent of the force with which the feeler member is manipulated. Also to prevent the float from threshing about in the tank upon agitation of the liquid, as might be the case in the fuel tank of a motor-vehicle, I have shown the plate 11 as formed above the pivot 7 with a circular, ratchet-toothed edge 21, arranged to be engaged by the upper edge of the plate 14.

To determine the amount of liquid in the tank the scale-slide is lifted to free the float and permit its descent to the level of said liquid, the lower end of said slide being stopped in the lower eccentric-toothed edge 20 of the plate 11 and the scale exposed above the upper end of the guide-shell, the lowermost visible mark of the scale being the index to the quantity of liquid in said tank.

While I have described my invention with reference to the embodiment here shown, it will be understood that changes or omissions may be made in this embodiment without departure from the invention.

Having thus described my invention what I claim is:—

1. A gage for liquid containing tanks, comprising a reciprocable member, means normally maintaining said member at one limit of its movement, a float, and means connected to said float and arranged to limit the movement of said reciprocable member away from its normal position to an amount depending upon the amount of liquid in said tank.

2. A gage for liquid containing tanks, comprising an upright member, a device slidable along said member, means normally maintaining said member at one point of its movement, a float, and means attached to said float and projecting into the path of movement of said device and arranged to limit the movement of the same away from its normal position to an amount depending upon the amount of liquid in the tank.

3. A gage for liquid containing tanks, comprising a float within the tank, means for guiding the float in its movements, a manually operable feeler member projecting through the tank wall, means normally maintaining said feeler member in a definite position, and means for arresting the movement of said feeler member away from said normal position at a point dependent upon the position of the float, whereby the liquid content of the tank may be indicated.

4. In a gage for liquid containing tanks, in combination, a supporting member, a float carried thereby, a feeler member movable along said supporting member and comprising manually operable means projecting outside of said tank whereby said feeler member may be shifted along said supporting member, means normally maintaining said feeler member in a definite zero position, and means for arresting the movement of said feeler member away from said zero position at a point dependent upon the position of the float.

5. In a gage for liquid containing tanks, in combination, a float adapted to follow the liquid level, a movable member supported independently of said float, manually operated means connected to said member and projecting outside of said tank and adapted to shift said movable member along a definite path, and means governed by said float for rendering the length of said path proportional to the amount of liquid in the tank, said member being normally maintained out of contact with said float governing means.

6. A gage for liquid containing tanks, comprising a substantially vertical guide member, a float, a manually operated feeler member supported for movement independently of said float and parallel to said guide member, and means connected to said float for restraining the movement of said feeler member in proportion to the amount of liquid in the tank, said feeler member being normally maintained out of contact with said means.

7. In a gage for liquid containing tanks, a manually reciprocable member, a float, and means connected to said float for limiting the movement of said member according to the amount of liquid in the tank, said member being normally maintained out of contact with said means.

8. A liquid-gage attachable to a tank to depend therein, and which comprises a vertical shell, a scale-slide guided in the shell through the upper end thereof, a plate in pivotal connection with the lower portion of said shell and having an upper circular ratchet-toothed edge and a similarly toothed lower eccentric edge with which said slide is alternately engageable, a rod extending from the plate between said edges thereof, and a float attached to the rod.

9. A liquid-gage attachable to a tank to depend therein, and which comprises a vertical shell longitudinally slotted at its lower end, a scale-slide guided in the shell through the upper end of the same and also longitudinally slotted at its lower end, a pivotally hung plate engaging the shell and slide slots and which has an upper circular ratchet-toothed edge and a similarly toothed lower eccentric edge with which said slide is alternately engageable, a rod extending from the plate between said edges thereof and a float attached to the rod.

10. A liquid-gage attachable to a tank and which comprises a vertical shell provided with an upper flange constituting a closure for an opening in a tank through which the shell depends, a scale-slide guided in said shell through the upper end of the same, a plate in pivotal connection with the lower portion of the aforesaid shell and having an upper circular ratchet-toothed edge and a similarly toothed lower eccentric edge with which said slide is alternately engageable, a rod extending from the plate between said edges thereof and a float attached to the rod.

11. A liquid-gage attachable to a tank to depend therein and which comprises a vertical shell having an upper stuffing-box end, a spring-controlled scale-slide guided in the shell through said upper end thereof, a plate in pivotal connection with the lower portion of said shell and having an upper circular ratchet-toothed edge and a similarly toothed lower eccentric edge with which said slide is alternately engageable, a rod extending from the plate between said edges thereof and a float attached to the rod.

12. A liquid-gage attachable to a tank and which comprises a vertical shell having an upper stuffing-box end and a lower longitudinal slot, a scale-rod guided in the shell through said upper end thereof and having a lower offset longitudinally slotted plate-extension, a pivotally hung plate engaging the slots of the shell and plate extension of the scale-rod, an upper circular edge of the pivotal plate and a lower eccentric edge of the same being ratchet-toothed for alternate engagement of said slide, a rod extending from said plate between the toothed edges thereof, and a float attached to the rod.

In testimony whereof, I hereunto affix my signature.

HARRISON D. FLEGEL.